United States Patent
Maruyama et al.

(10) Patent No.: US 8,546,475 B2
(45) Date of Patent: Oct. 1, 2013

(54) INFRARED REFLECTING BLACK PIGMENT, AND PAINT AND RESIN COMPOSITION USING THE INFRARED REFLECTING BLACK PIGMENT

(75) Inventors: Shinsuke Maruyama, Hiroshima-ken (JP); Kazushi Nishimoto, Hiroshima-ken (JP); Hiroshi Akai, Hiroshima-ken (JP); Kazutoshi Sanada, Hiroshima-ken (JP); Yasuhiko Fujii, Hiroshima-ken (JP)

(73) Assignee: Toda Kogyo Corporation, Otake-shi, Hiroshima-ken (JP)

( * ) Notice: Subject to any disclaimer, the term of this patent is extended or adjusted under 35 U.S.C. 154(b) by 0 days.

(21) Appl. No.: 13/508,573

(22) PCT Filed: Nov. 9, 2010

(86) PCT No.: PCT/JP2010/069924
§ 371 (c)(1),
(2), (4) Date: Jun. 21, 2012

(87) PCT Pub. No.: WO2011/058966
PCT Pub. Date: May 19, 2011

(65) Prior Publication Data
US 2012/0270986 A1    Oct. 25, 2012

(30) Foreign Application Priority Data
Nov. 11, 2009 (JP) .................................. 2009-258324

(51) Int. Cl.
*C08K 3/22*    (2006.01)
(52) U.S. Cl.
USPC ........... 524/431; 524/413; 524/430; 524/432; 524/433; 524/434; 524/437
(58) Field of Classification Search
USPC .................................. 524/430–434, 437, 413
See application file for complete search history.

(56) References Cited

U.S. PATENT DOCUMENTS

| | | |
|---|---|---|
| 5,009,712 A | 4/1991 | Tamari et al. |
| 6,235,106 B1 | 5/2001 | Loucka et al. |
| 2001/0022151 A1* | 9/2001 | Sliwinski et al. ............. 106/453 |
| 2002/0117084 A1 | 8/2002 | Hayashi et al. |
| 2002/0191565 A1 | 12/2002 | Mani et al. |
| 2009/0272297 A1 | 11/2009 | Stratton et al. |
| 2011/0000401 A1 | 1/2011 | Stratton et al. |
| 2011/0068308 A1 | 3/2011 | Takaoka et al. |

FOREIGN PATENT DOCUMENTS

| | | |
|---|---|---|
| JP | 2000-351914 | 12/2000 |
| JP | 2002-020119 | 1/2002 |
| JP | 2003-055603 A | 2/2003 |
| JP | 2006-265421 | 10/2006 |
| JP | 2007-204348 | 8/2007 |
| JP | 2007-217544 A | 8/2007 |
| JP | 2008-044805 | 2/2008 |
| WO | WO 2009/134461 A2 | 11/2009 |
| WO | WO 2009/134461 A3 | 11/2009 |
| WO | WO 2009/142254 | 11/2009 |

OTHER PUBLICATIONS

Supplementary Search Report in EP 10 82 9925 issued Jan. 23, 2013.
International Search Report for PCT/JP2010/069924, mailed Feb. 15, 2011.

* cited by examiner

*Primary Examiner* — Peter Szekely
(74) *Attorney, Agent, or Firm* — Nixon & Vanderhye P.C.

(57) ABSTRACT

The present invention provides an inexpensive infrared reflecting black pigment which comprises Fe and Mn but comprises no harmful elements, and exhibits an excellent infrared reflecting property. The infrared reflecting black pigment according to the present invention comprises a compound comprising Fe, Mn and at least one element selected from the group consisting of Mg, Al, Ca, Si, Sr and Ba, and has a blackness (L* value) of not more than 30 and a solar radiation reflectance of not less than 15%.

6 Claims, 1 Drawing Sheet

INFRARED REFLECTING BLACK PIGMENT, AND PAINT AND RESIN COMPOSITION USING THE INFRARED REFLECTING BLACK PIGMENT

This application is the U.S. national phase of International Application No. PCT/JP2010/069924 filed 9 Nov. 2010 which designated the U.S. and claims priority to JP Patent Application No. 2009-258324 filed 11 Nov. 2009, the entire contents of each of which are hereby incorporated by reference.

TECHNICAL FIELD

The present invention relates to an infrared reflecting black pigment which is capable of providing a heat-shielding paint and a heat-shielding resin composition comprising no harmful elements and exhibiting an excellent infrared reflecting property, in particular, relates to an infrared reflecting black pigment comprising Fe and Mn as well as at least one element selected from the group consisting of Mg, Al, Ca, Si, Sr and Ba.

BACKGROUND ART

In the roads, buildings, storage tanks, automobiles, ships, etc., which are used or located out of doors, an inside temperature thereof is increased when exposed to solar radiation. For this reason, an outside surface of buildings, automobiles, etc., or molded products formed of resin compositions have been painted with a white to light color in order to reflect sunlight thereon, thereby enhancing a heat-shielding effect thereof to some extent.

However, in particular, roofs of buildings exposed to outside are frequently painted with a deep to black color to make stains or contamination thereon unremarkable when viewed from outside. Buildings, automobiles, etc., whose outside surface is painted with a deep to black color, tend to absorb sunlight as compared to those having an outside surface painted with a light to white color, and therefore tend to suffer from considerable increase in inside temperature when exposed to solar radiation. Such a high inside temperature of buildings, automobiles, etc., is undesirable for transportation or storage of products.

From the standpoint of saving energies required for preventing global warming problems, it has been strongly demanded to suppress the increase in inside temperature of buildings, automobiles, etc., whose outside surface exhibits a deep color to a black color.

Hitherto, there are known black pigments comprising Mn and Fe (refer to Patent Documents 1 and 2).

In Patent Document 1, there are described heat-resistant black pigments comprising $Mn_2O_3$ and $Fe_2O_3$ which have a hematite structure. However, the black pigments described in Patent Document 1 tend to hardly exhibit a sufficient blackness degree.

In addition, in Patent Document 2, there are described black composite oxide particles comprising Mn and Fe which have a non-spinel structure. However, the black composite oxide particles described in Patent Document 2 tend to hardly exhibits a sufficient heat-shielding effect.

PRIOR ART DOCUMENTS

Patent Documents

Patent Document 1: Japanese Patent Application Laid-Open (KOKAI) No. 05-221653
Patent Document 2: Japanese Patent Application Laid-Open (KOKAI) No. 2003-238163

SUMMARY OF THE INVENTION

Problem to be Solved by the Invention

As described above, some black pigments not only comprising no harmful elements but also having an excellent infrared reflecting property have been conventionally developed. However, these black pigments have also failed to exhibit sufficient properties, and it has therefore been demanded to further improve the black pigments. The above problems are posed on not only the black pigments but also ash-colored blackish-gray pigments.

An object of the present invention is to provide an inexpensive infrared reflecting black pigment comprising no harmful elements and exhibiting an excellent infrared reflecting property which comprises Fe and Mn as well as at least one element selected from the group consisting of Mg, Al, Ca, Si, Sr and Ba.

Means for Solving Problem

The above object of the present invention can be achieved by the following aspects of the present invention.

That is, according to the present invention, there is provided an infrared reflecting black pigment comprising a compound comprising Fe, Mn and at least one element selected from the group consisting of Mg, Al, Ca, Si, Sr and Ba, which infrared reflecting black pigment has a blackness ($L^*$ value) of not more than 30 and a solar radiation reflectance of not less than 15% (Invention 1).

Also, according to the present invention, there is provided the infrared reflecting black pigment as described in the above Invention 1, wherein the compound comprising Fe, Mn and at least one element selected from the group consisting of Mg, Al, Ca, Si, Sr and Ba is in the form of a composite oxide (Invention 2).

Also, according to the present invention, there is provided the infrared reflecting black pigment as described in the above Invention 1, wherein the black pigment comprises a mixture of an Mn—Fe composite oxide and a compound comprising at least one element selected from the group consisting of Mg, Al, Ca, Si, Sr and Ba (Invention 3).

Also, according to the present invention, there is provided the infrared reflecting black pigment as described in the above Invention 3, wherein the compound comprising at least one element selected from the group consisting of Mg, Al, Ca, Si, Sr and Ba is mixed in an amount of 20 to 300 parts by weight based on 100 parts by weight of the Mn—Fe composite oxide (Invention 4).

In addition, according to the present invention, there is provided a paint comprising a paint base material comprising the infrared reflecting black pigment as described in any one of the above Inventions 1 to 4 (Invention 5).

Further, according to the present invention, there is provided a colored resin composition comprising the infrared reflecting black pigment as described in any one of the above Inventions 1 to 4, and a resin.

Effect of the Invention

The infrared reflecting black pigment according to the present invention is a safe black pigment comprising Fe, Mn and at least one element selected from the group consisting of Mg, Al, Ca, Si, Sr and Ba but comprising no harmful elements such as Cr, and exhibits an excellent infrared reflecting property, and therefore can be suitably used as an infrared reflecting black pigment.

Also, the infrared reflecting black pigment according to the present invention comprises Fe, Mn and at least one element selected from the group consisting of Mg, Al, Ca, Si, Sr and Ba as main components and comprises no expensive elements such as Co, and can be suitably used as an inexpensive infrared reflecting black pigment.

PREFERRED EMBODIMENTS FOR CARRYING OUT THE INVENTION

Figure 1:
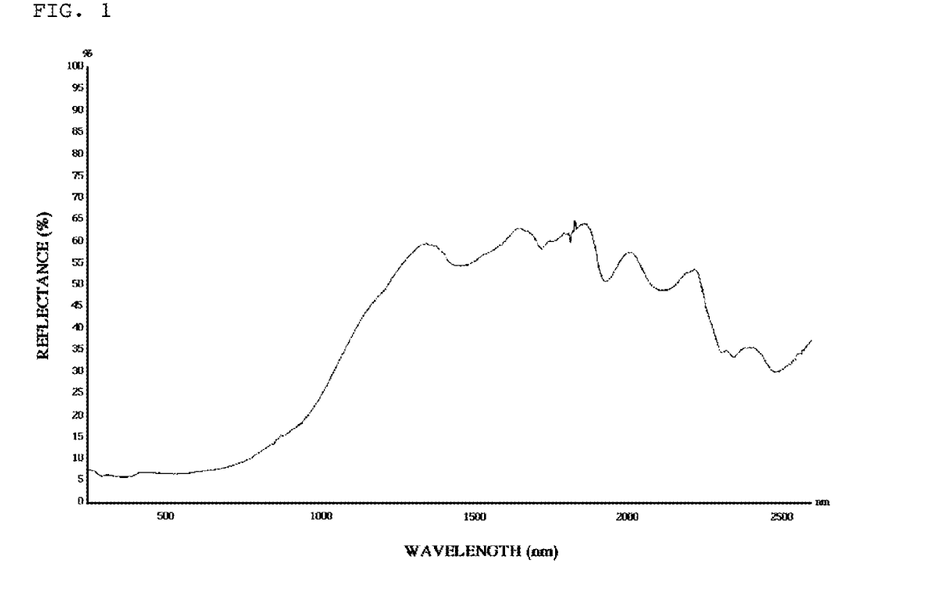
FIG. 1 is a view showing a solar radiation reflectance of the infrared reflecting black pigment obtained in Example 1 according to the present invention.
Figure 2:
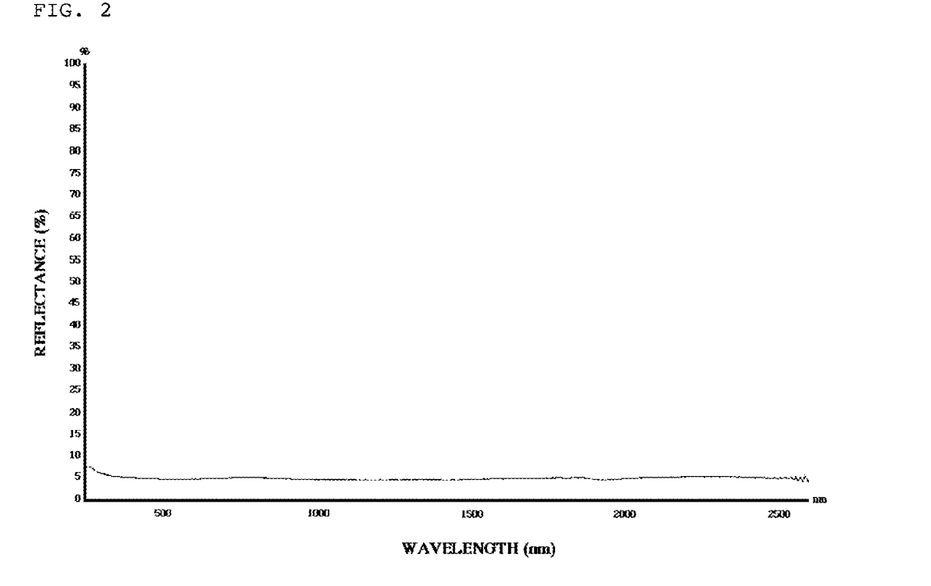
FIG. 2 is a view showing a solar radiation reflectance of the black pigment obtained in Comparative Example 1.

The present invention is described in detail below.

First, the infrared reflecting black pigment according to the present invention is described.

The infrared reflecting black pigment according to the present invention comprises a composite oxide or a mixture which comprises Fe and Mn and further comprises, as a secondary component, at least one element selected from the group consisting of Mg, Al, Ca, Si, Sr and Ba. The infrared reflecting black pigment according to the present invention is a safe black pigment comprising no harmful elements. Examples of the harmful elements include Cr and the like. The infrared reflecting black pigment according to the present invention comprises substantially none of these harmful elements. Meanwhile, examples of the highly safe but expensive elements include Co and the like, and the infrared reflecting black pigment according to the present invention desirably comprises none of these elements from the viewpoint of low costs.

With respect to the contents of the respective metal elements in the infrared reflecting black pigment according to the present invention based on the whole metal elements in the black pigment, the content of Mn is 1 to 60 mol %; the content of Fe is 10 to 95 mol %; the content of Mg is 3 to 70 mol %; the content of Al is 3 to 70 mol %; the content of Ca is 3 to 70 mol %; the content of Si is 3 to 70 mol %; the content of Sr is 3 to 70 mol %; and the content of Ba is 3 to 70 mol %. Preferably, the content of Mn is 5 to 45 mol %; the content of Fe is 15 to 90 mol %; the content of Mg is 5 to 65 mol %; the content of Al is 5 to 65 mol %; the content of Ca is 5 to 65 mol %; the content of Si is 5 to 65 mol %; the content of Sr is 5 to 65 mol %; and the content of Ba is 5 to 65 mol %. When the contents of the respective metal elements are out of the above-specified ranges, the resulting black pigment may fail to exhibit a sufficient solar radiation reflectance or L* value. In addition, the infrared reflecting black pigment according to the present invention may sometimes inevitably comprise impurities derived from various raw materials, but the amounts of the impurities included therein are trace.

The contents of Mn and Fe in the infrared reflecting black pigment according to the present invention may be controlled such that the molar ratio of Mn to Fe therein is preferably 1:0.5 to 1:30, more preferably 1:0.8 to 1:25 and still more preferably 1:1 to 1:20.

In the infrared reflecting black pigment according to the present invention, the molar ratio of a sum of Mg, Al, Ca, Si, Sr and Ba to a sum of Mn and Fe [(Mg+Al+Ca+Si+Sr+Ba)/(Mn+Fe)] is preferably 0.1 to 5. When the molar ratio [(Mg+Al+Ca+Si+Sr+Ba)/(Mn+Fe)] is less than 0.1, the resulting black pigment may fail to exhibit a sufficient solar radiation reflectance. When the molar ratio [(Mg+Al+Ca+Si+Sr+Ba)/(Mn+Fe)] is more than 5, the blackness L* value of resulting black pigment is more than 30, so that the obtained black pigment tends to hardly exhibit a sufficient blackness.

The infrared reflecting black pigment according to the present invention preferably has an average particle diameter of 0.02 to 5.0 μm. When the average particle diameter of the infrared reflecting black pigment is more than 5.0 μm, the particle size of the infrared reflecting black pigment tends to be excessively large, resulting in deterioration in tinting strength thereof. When the average particle diameter of the infrared reflecting black pigment is less than 0.02 μm, the resulting black pigment tends to be hardly dispersed in a vehicle. The average particle diameter of the infrared reflecting black pigment according to the present invention more preferably 0.025 to 4.0 μm and still more preferably 0.04 to 2.0 μm.

The infrared reflecting black pigment according to the present invention preferably has a BET specific surface area of 1 to 100 m$^2$/g. When the BET specific surface area of the infrared reflecting black pigment is less than 1 m$^2$/g, the resulting pigment tends to be in the form of coarse particles or particles which suffer from sintering therebetween, and therefore tends to be deteriorated in tinting strength. On the other hand, when the BET specific surface area of the infrared reflecting black pigment is more than 100 m$^2$/g, the resulting particles tend to be aggregated together owing to increase in intermolecular force therebetween which is caused by finely divided particles, so that it may be difficult to uniformly coat the surface of the respective particles with a surface-treating agent. The BET specific surface area of the infrared reflecting black pigment according to the present invention is more preferably 1.5 to 75 m$^2$/g and still more preferably 1.8 to 65 m$^2$/g.

The infrared reflecting black pigment according to the present invention preferably has a lightness (L* value) of not more than 30. When the lightness (L* value) of the infrared reflecting black pigment is out of the above-specified range, the resulting pigment tends to hardly exhibit a sufficient blackness required as a black pigment. The lightness (L* value) of the infrared reflecting black pigment is more preferably not more than 28.

The infrared reflecting black pigment according to the present invention preferably has an a* value of −2 to +10. When the a* value of the infrared reflecting black pigment is out of the above-specified range, the resulting pigment tends to hardly exhibit a sufficient blackness required as a black pigment. The a* value of the infrared reflecting black pigment according to the present invention is more preferably −1 to +5.

The infrared reflecting black pigment according to the present invention preferably has a b* value of −5 to +10. When the b* value of the infrared reflecting black pigment is out of the above-specified range, the resulting pigment tends to hardly exhibit a sufficient blackness required as a black pigment. The b* value of the infrared reflecting black pigment according to the present invention is more preferably −4 to +5.

The infrared reflecting property of the infrared reflecting black pigment according to the present invention is controlled such that the solar radiation reflectance thereof as measured for lacquer color sample coating according to JIS R 3106 is preferably not less than 15% and more preferably not less than 16%. When the solar radiation reflectance of the infrared reflecting black pigment is less than 15%, the resulting pigment may fail to exhibit a sufficient solar radiation reflectance.

The particle shape of the infrared reflecting black pigment according to the present invention is not particularly limited, and the infrared reflecting black pigment may be in the form of granular particles such as particles having a spherical shape, a granular shape, an octahedral shape, a hexahedral shape, a polyhedral shape or the like, acicular particles such as particles having an acicular shape, a spindle shape, a rice grain shape or the like, and plate-shaped particles. Among these particles, in view of a good dispersibility of the resulting particles, preferred are spherical particles and granular particles.

In the infrared reflecting black pigment according to the present invention, as the surface-treating agent used for coating the surface of the respective particles of the infrared reflecting black pigment, there may be used compounds of at least one element selected from the group consisting of Si, Al, Zr, Ti, Zn and P, and organic surface-treating agents.

Examples of the compounds of at least one element selected from the group consisting of Si, Al, Zr, Ti, Zn and P include aluminum compounds such as aluminum salts such as aluminum acetate, aluminum sulfate, aluminum chloride and aluminum nitrate, and alkali salts of aluminic acid such as sodium aluminate; silicon compounds such as water glass #3, sodium orthosilicate and sodium metasilicate; zirconium compounds such as zirconium salts such as zirconium acetate, zirconium sulfate, zirconium chloride and zirconium nitrate; titanium compounds such as titanium salts such as titanium acetate, titanium sulfate, titanium chloride and titanium nitrate; zinc compounds such as zinc salts such as zinc acetate, zinc sulfate, zinc chloride and zinc nitrate; and phosphorus compounds such as phosphoric acid salts such as sodium hydrogen phosphate, sodium ammonium hydrogen phosphate, potassium phosphate, sodium polyphosphate and sodium hexametaphosphate.

Examples of the organic surface-treating agents include stearic acid and salts thereof, rosins, organic silicon compounds such as alkoxy silanes, fluoroalkyl silanes, silane-based coupling agents and organopolysiloxanes, coupling agents such as titanate-based coupling agents, aluminate-based coupling agents and zirconate-based coupling agents, low-molecular weight surfactants or high-molecular weight surfactants, and phosphoric acid compounds.

Specific examples of the organic silicon compounds include alkoxy silanes such as methyl ethoxysilane, dimethyl diethoxysilane, phenyl triethoxysilane, diphenyl diethoxysilane, methyl trimethoxysilane, dimethyl dimethoxysilane, phenyl trimethoxysilane, diphenyl dimethoxysilane, ethyl triethoxysilane, propyl triethoxysilane, butyl triethoxysilane, isobutyl trimethoxysilane, hexyl triethoxysilane, octyl triethoxysilane and decyl triethoxysilane; fluoroalkyl silanes such as trifluoropropyl trimethoxysilane, tridecafluorooctyl trimethoxysilane, heptadecafluorodecyl trimethoxysilane, trifluoropropyl triethoxysilane, heptadecafluorodecyl triethoxysilane and tridecafluorooctyl triethoxysilane; silane-based coupling agents such as vinyl trimethoxysilane, vinyl triethoxysilane, γ-aminopropyl triethoxysilane, γ-glycidoxypropyl trimethoxysilane, γ-mercaptopropyl trimethoxysilane, γ-methacryloyloxypropyl trimethoxysilane, N-(β-aminoethyl)-γ-aminopropyl trimethoxysilane, γ-glycidoxypropylmethyl dimethoxysilane and γ-chloropropyl trimethoxysilane; and organopolysiloxanes such as polysiloxanes, methyl hydrogen polysiloxanes and modified polysiloxanes.

Examples of the titanate-based coupling agents include isopropyl tristearoyl titanate, isopropyl tris(dioctyl pyrophosphate)titanate, isopropyl tri(N-aminoethyl-aminoethyl)titanate, tetraoctyl bis(ditridecyl phosphate)titanate, tetra(2,2-diallyloxymethyl-1-butyl) bis(tridecyl)phosphate titanate, bis(dioctyl pyrophosphate)oxyacetate titanate and bis(dioctyl pyrophosphate)ethylene titanate.

Examples of the aluminate-based coupling agents include acetalkoxy aluminum diisopropylate, aluminum diisopropoxy monoethyl acetoacetate, aluminum tris(ethyl acetoacetate), aluminum tris(acetyl acetonate).

Examples of the zirconate-based coupling agents include zirconium tetrakis(acetyl acetonate), zirconium dibutoxy bis(acetyl acetonate), zirconium tetrakis(ethyl acetoacetate), zirconium tributoxy monoethyl acetoacetate and zirconium tributoxy acetyl acetonate.

Examples of the low-molecular weight surfactants include alkyl benzene-sulfonic acid salts, dioctyl sulfone-succinic acid salts, alkyl amine-acetic acid salts and alkyl fatty acid salts. Examples of the high-molecular weight surfactants include polyvinyl alcohol, polyacrylic acid salts, carboxymethyl cellulose, acrylic acid-maleic acid salt copolymers and olefin-maleic acid salt copolymers.

Examples of the phosphoric acid compounds include organic phosphorus compounds such as phosphoric acid esters, phosphorous acid esters, acid phosphoric acid esters and phosphonic acid.

Next, the process for producing the infrared reflecting black pigment according to the present invention is described.

The infrared reflecting black pigment comprising the composite oxide according to the present invention can be produced by mixing various raw materials with each other and then calcining the resultant mixture.

The method of mixing the starting materials is not particularly limited as long as these materials can be uniformly mixed with each other, and there may be used either a wet-mixing method or a dry-mixing method. In addition, there may also be used a wet synthesis method.

The heat-calcining temperature is preferably 700 to 1200° C. and more preferably 800 to 1050° C. The heating atmosphere may be an atmospheric air.

The particles obtained after heating may be washed with water and then pulverized by ordinary methods.

Next, the process for producing the mixture of an Mn—Fe composite oxide and a compound comprising at least one element selected from the group consisting of Mg, Al, Ca, Si, Sr and Ba which provides one of preferred forms of the infrared reflecting black pigment according to the present invention, is described.

In the present invention, the Mn—Fe composite oxide is a composite oxide comprising at least Mn and Fe, and may further comprise at least one element selected from the group consisting of Mg, Al, Ca, Si, Sr and Ba, if required.

The Mn—Fe composite oxide used in the present invention may be obtained by mixing various raw materials with each other and then calcining the resulting mixture. The mixing and calcination may be conducted in the same manner as described above.

Examples of the compound comprising at least one element selected from the group consisting of Mg, Al, Ca, Si, Sr and Ba as used in the present invention include magnesium hydroxide, silicon oxide, calcium carbonate, aluminum oxide, aluminum hydroxide, kaolin, barium carbonate, barium sulfate and strontium carbonate.

In the present invention, any mixing method and apparatus can be used without any particular limitations as long as the Mn—Fe composite oxide and the above compound are uniformly mixed with each other.

In the present invention, the mixing ratio of the compound comprising at least one element selected from the group consisting of Mg, Al, Ca, Si, Sr and Ba is preferably 20 to 300 parts by weight based on 100 parts by weight of the Mn—Fe composite oxide. When the mixing ratio of the above compound is less than 20 parts by weight, the resulting black pigment tends to hardly exhibit a sufficient solar radiation reflectance. When the mixing ratio of the above compound is more than 300 parts by weight, the resulting black pigment tends to have an excessively high $L^*$ value. The mixing ratio of the compound comprising at least one element selected from the group consisting of Mg, Al, Ca, Si, Sr and Ba is more preferably 30 to 250 parts by weight.

In the present invention, the surface of the respective particles of the infrared reflecting black pigment may be coated with one or more compounds of metals selected from the group consisting of Si, Al and Zr. The surface-treating method may be carried out by an ordinary method such as a wet method and a dry method. For example, as the wet method, there may be used the method in which the infrared reflecting black pigment is wet-dispersed to prepare a slurry, and then one or more soluble compounds of metals selected from the group consisting of Si, Al and Zr are added to and mixed with the thus obtained slurry while adjusting a pH value of the slurry with an alkali or an acid to coat the black pigment with the soluble compounds. As the dry method, there may be used the method in which the infrared reflecting black pigment is subjected to coating treatment with one or more coupling agents comprising metals selected from the group consisting of Si, Al and Zr in an apparatus such as a Henschel mixer.

In the dry method, as the apparatus used upon the mixing and stirring, there are preferably used those apparatuses which are capable of applying a shear force to a layer of the particles, more preferably those apparatuses which are capable of conducting application of shear force, spatula-stroking and compression at the same time. Examples of these apparatuses include wheel-type kneaders, ball-type kneaders, blade-type kneaders, roll-type kneaders or the like. Among these apparatuses, the wheel-type kneaders can be more effectively used in the present invention.

Specific examples of the wheel-type kneaders used in the above dry method include an edge runner (equivalent to a "mix muller", a "Simpson mill" or a "sand mill"), a multi-mull, a Stotz mill, a wet pan mill, a Conner mill, a ring muller, or the like. Among them, an edge runner, a multi-mull, a Stotz mill, a wet pan mill and a ring muller are preferred, and an edge runner is more preferred. Specific examples of the ball-type kneaders include a vibration mill or the like. Specific examples of the blade-type kneaders include a Henschel mixer, a planetary mixer, a Nauta mixer or the like. Specific examples of the roll-type kneaders include an extruder or the like.

As the apparatus used upon mixing and stirring the black pigment and the surface-treating agent, there are preferably used those apparatuses which are capable of applying a shear force to a layer of the particles, more preferably those apparatuses which are capable of conducting application of shear force, spatula-stroking and compression at the same time. Examples of these apparatuses include wheel-type kneaders, ball-type kneaders, blade-type kneaders, roll-type kneaders or the like. Among these apparatuses, the wheel-type kneaders can be more effectively used in the present invention.

Specific examples of the wheel-type kneaders used upon mixing and stirring the black pigment and the surface-treating agent include an edge runner (equivalent to a "mix muller", a "Simpson mill" or a "sand mill"), a multi-mull, a Stotz mill, a wet pan mill, a Conner mill, a ring muller, or the like. Among them, an edge runner, a multi-mull, a Stotz mill, a wet pan mill and a ring muller are preferred, and an edge runner is more preferred. Specific examples of the ball-type kneaders include a vibration mill or the like. Specific examples of the blade-type kneaders include a Henschel mixer, a planetary mixer, a Nauta mixer or the like. Specific examples of the roll-type kneaders include an extruder or the like.

Next, the paint comprising the infrared reflecting black pigment according to the present invention is described.

The amount of the infrared reflecting black pigment compounded in the paint according to the present invention is usually 0.5 to 100 parts by weight on the basis of 100 parts by weight of a paint base material. In the consideration of a good handling property of the obtained paint, the amount of the infrared reflecting black pigment compounded is preferably 1.0 to 100 parts by weight.

The paint base material may comprise a resin, a solvent and, if required, an optional component such as fats and oils, a defoaming agent, a drying accelerator, a surfactant, a curing accelerator and other assistants.

As the resin, there may be used various resins ordinarily used for solvent-based paints or oil-based printing inks. Examples of the resins include acrylic resins, alkyd resins, polyester resins, polyurethane resins, epoxy resins, phenol resins, melamine resins, amino resins, vinyl chloride resins, silicone resins, rosin-based resins such as gum rosins and lime rosins, maleic acid resins, polyamide resins, nitrocellulose, ethylene-vinyl acetate copolymer resins, rosin-modified resins such as rosin-modified phenol resins and rosin-modified maleic acid resins, petroleum resins and fluororesins. In particular, as the resins for water-based paints, there may be used those resins ordinarily used for water-based paints or water-based inks. Examples of the resins for water-based paints may include water-soluble acrylic resins, water-soluble styrene-maleic acid resins, water-soluble alkyd resins, water-soluble melamine resins, water-soluble urethane emulsion resins, water-soluble epoxy resins, water-soluble polyester resins, water-soluble fluororesins, etc.

As the solvent, there may be used those solvents ordinarily used for solvent-based paints. Examples of the solvents may include soybean oil, toluene, xylene, a thinner, butyl acetate, methyl acetate, methyl isobutyl ketone, methyl cellosolve, ethyl cellosolve, propyl cellosolve, butyl cellosolve, glycol ether-based solvents such as propylene glycol monomethyl ether, ester-based solvents such as ethyl acetate, butyl acetate and amyl acetate, aliphatic hydrocarbon-based solvents such as hexane, heptane and octane, alicyclic hydrocarbon-based solvents such as cyclohexane, petroleum-based solvents such as mineral spirits, ketone-based solvents such as acetone and methyl ethyl ketone, alcohol-based solvents such as methyl alcohol, ethyl alcohol, propyl alcohol and butyl alcohol, and aliphatic hydrocarbons.

As the solvents for water-based paints, there may be used mixtures of water with those water-soluble organic solvents ordinarily used for water-based paints. Examples of the water-soluble organic solvents for water-based paints may include alcohol-based solvents such as ethyl alcohol, propyl alcohol and butyl alcohol; glycol ether-based solvents such as methyl cellosolve, ethyl cellosolve, propyl cellosolve and butyl cellosolve; oxyethylene or oxypropylene addition polymers such as diethylene glycol, triethylene glycol, polyethylene glycol, dipropylene glycol, tripropylene glycol and polypropylene glycol; alkylene glycols such as ethylene glycol, propylene glycol and 1,2,6-hexanetriol; glycerol; and 2-pyrrolidone.

Examples of the fats and oils may include boiled oils obtained by processing dry oils such as linseed oil, tung oil, oiticica oil and safflower oil.

Examples of the defoaming agent may include commercially available products such as "NOPCO 8034 (tradename)", "SN DEFOAMER 477 (tradename)", "SN DEFOAMER 5013 (tradename)", "SN DEFOAMER 247 (tradename)" and "SN DEFOAMER 382 (tradename)" all produced by Sun Nopco Co., Ltd., and "ANTI-FOAM 08 (tradename)" and "EMULGEN 903 (tradename)" both produced by Kao Corp.

Next, the resin composition comprising the infrared reflecting black pigment according to the present invention is described. The resin composition according to the present invention is tinted with a black-based color using the infrared reflecting black pigment according to the present invention, and may be further tinted by adding the other pigments or dyes thereto.

The amount of the infrared reflecting black pigment compounded in the resin composition according to the present invention may be in the range of 0.01 to 200 parts by weight on the basis of 100 parts by weight of the resin. In the consideration of a good handling property of the obtained resin composition, the amount of the infrared reflecting black pigment compounded therein is preferably 0.05 to 150 parts by weight and more preferably 0.1 to 100 parts by weight.

The base material for the resin composition according to the present invention may include, in addition to the infrared reflecting black pigment and a known thermoplastic resin, various optional additives such as a lubricant, a plasticizer, an antioxidant, an ultraviolet absorber and various stabilizers, if required.

Examples of the resin compounded in the resin composition may include polyolefins such as polyethylene, polypropylene, polybutene and polyisobutylene; thermoplastic resins such as polyvinyl chloride, polymethyl pentene, polyethylene terephthalate, polybutylene terephthalate, polystyrene, styrene-acrylate copolymers, styrene-vinyl acetate copolymers, acrylonitrile-butadiene-styrene copolymers, acrylonitrile-EPDM-styrene copolymers, acrylic resins, polyamides, polycarbonates, polyacetals and polyurethanes; rosin-modified maleic acid resins; phenol resins; epoxy resins; polyester resins; silicone resins; rosin esters; rosins; natural rubbers; and synthetic rubbers.

The amount of the additives added to the resin composition may be not more than 50% by weight on the basis of the total weight of the infrared reflecting black pigment and the resin. When the content of the additives in the resin composition is more than 50% by weight, the obtained resin composition tends to be deteriorated in moldability.

The resin composition according to the present invention may be produced by previously intimately mixing the raw resin material with the infrared reflecting black pigment, and then applying a strong shear force to the resultant mixture under heating by using a kneader or an extruder to deaggregate or break agglomerated particles of the infrared reflecting black pigment and uniformly disperse the infrared reflecting black pigment in the resin composition. Then, the resultant resin composition may be molded into a desired shape according to the objects and applications thereof.

Also, the resin composition according to the present invention may be produced via master batch pellets.

The master batch pellets used in the present invention may be produced by the method of mixing a binder resin as the paint base material or the resin composition base material with the infrared reflecting black pigment, if required, by using a mixing apparatus such as a ribbon blender, a Nauta mixer, a Henschel mixer and a super mixer, and then kneading and molding the resultant mixture by using a known single-screw or twin-screw kneading extruder, etc., followed by cutting the resultant molded material, or by the method of kneading the above mixture by using a Banbury mixer, a press kneader, etc., and then subjecting the resulting kneaded material to pulverization, molding and cutting.

Upon feeding the binder resin and the infrared reflecting black pigment to the kneader, these materials may be respectively fed thereto at predetermined ratios, or a mixture of both the materials may be fed thereto.

The average major axis diameter of the master batch pellets used in the present invention is 1 to 6 mm and preferably 2 to 5 mm, whereas the average minor axis diameter thereof is 2 to 5 mm and preferably 2.5 to 4 mm. When the average major axis diameter of the master batch pellets is less than 1 mm, the workability upon production of the pellets tends to be deteriorated. When the average major axis diameter of the master batch pellets is more than 6 mm, the difference in size between the master batch pellets and diluting binder resin particles tends to be considerably large, so that it may be difficult to sufficiently disperse the pellets in the diluting binder resin. The master batch pellets may have various shapes such as an amorphous shape, a granular shape such as a spherical shape, a cylindrical shape, a flake-like shape, etc.

The binder resin used for production of the master batch pellets used in the present invention may be the same as the resin to be included in the resin composition.

Meanwhile, the composition of the binder resin used in the master batch pellets may be the same as or different from that of the diluting binder resin. When using the resin having a different composition from that of the diluting binder resin, the resin to be included in the master batch pellets may be determined in the consideration of various properties so as to attain a good compatibility between these resins.

The amount of the infrared reflecting black pigment compounded in the master batch pellets is 1 to 200 parts by weight, preferably 1 to 150 parts by weight and more preferably 1 to 100 parts by weight on the basis of 100 parts by weight of the binder resin. When the amount of the infrared reflecting black pigment compounded in the master batch pellets is less than 1 part by weight, the resulting master batch pellets tend to exhibit an insufficient melt viscosity upon melt-kneading, so that it may be difficult to suitably disperse and mix the infrared reflecting black pigment in the master batch pellets. When the amount of the infrared reflecting black pigment compounded in the master batch pellets is more than 200 part by weight, the amount of the binder resin compounded therein tends to be comparatively lower than that of the infrared reflecting black pigment, so that it may be difficult to suitably disperse and mix the infrared reflecting black pigment in the master batch pellets. Further, a slight change in amount of the master batch pellets added tends to cause a considerable change in content of the infrared reflecting black pigment in the obtained resin composition, so that it may be difficult to attain a desired content of the infrared reflecting black pigment in the resin composition, resulting in severe mechanical abrasion thereof.

EXAMPLES

Next, the present invention is described in more detail by the following Examples. However, these Examples are only illustrative and not intended to limit the scope of the present invention thereto. The evaluation methods used in the following Examples and Comparative Examples are as follows.

The average particle diameter of the particles was measured by an air permeability method (Fisher method).

The specific surface area was expressed by the value measured by a BET method.

The contents of respective metal elements in the infrared reflecting black pigment were measured by a fluorescent X-ray analyzer "3063M Model" (manufactured by RIGAKU DENKI KOGYO CO., LTD.) according to JIS K0119 "General Rule of Fluorescent X-Ray Analysis".

The hue values ($L^*$, $a^*$ and $b^*$ values) of the infrared reflecting black pigment were determined as follows. That is, 0.5 g of a sample and 0.5 mL of castor oil were intimately kneaded with each other by a Hoover's muller to form a paste. Added to the thus obtained paste were 4.5 g of clear lacquer, and the resulting mixture was intimately kneaded to form a paint. The thus obtained paint was applied on a cast-coated paper by using a 150 µm (6-mil) applicator to produce a coating film piece (having a film thickness of about 30 µm). The hue of the thus obtained coating film piece was measured using a colorimeter/color difference meter "CR-300" (manufactured by KONICA MINOLTA SENSING Inc.), and expressed by color specification indices (L*, a* and b* values) according to JIS Z 8729.

The reflecting property of the infrared reflecting black pigment in each of a visible light wavelength range and an infrared wavelength range was determined as follows. That is, reflectance values (%) of the coating film piece prepared for the above hue measurement were measured in a wavelength range of 300 to 2100 nm using a spectrophotometer "U-4100" manufactured by Hitachi High-Technologies Corp., more specifically, the solar radiation reflectance values were measured according to JIS R 3106.

The temperature difference upon lamp irradiation of the infrared reflecting black pigment was determined as follows. That is, 0.5 g of a sample and 0.5 mL of castor oil were intimately kneaded with each other by a Hoover's muller to form a paste. Added to the obtained paste were 4.5 g of clear lacquer, and the resulting mixture was intimately kneaded to form a paint. The thus obtained paint was applied on an Al flat plate by using a 150 µm (6-mil) applicator to produce a coated Al plate (comprising a coating film having a thickness of about 30 µm). The respective coated plates were irradiated with an infrared ray for 10 min (output power of lamp: 250 W; distance between lamp and respective coated Al plates: 200 mm), and the temperature of a rear surface of the respective coated Al plates was measured. The difference between the thus measured temperature and the temperature measured in Comparative Example 1 was defined as the temperature difference of the respective samples.

Example 1

The respective oxides as raw materials were weighed and mixed with each other in such amounts as shown in Table 1 below, and then the resulting mixture was calcined at 1000° C. for 2 hr in an electric furnace to thereby obtain a calcined product. The resulting calcined product was pulverized, thereby obtaining a black pigment having a BET specific surface area of 11.3 m$^2$/g and an average particle diameter of 0.5 µm.

The thus obtained pigment was subjected to lacquer color painting to prepare a color sample thereof, and measured and evaluated for its reflectance in a wavelength range of 250 to 2500 nm using a spectrophotometer "U-4100" manufactured by Hitachi Limited. As a result of the above measurement and evaluation, it was confirmed that the resulting pigment had a solar radiation reflectance of 20.9% as measured in a wavelength range of 300 to 2100 nm.

Example 2

The same procedure as defined in Example 1 was conducted except that the wet method was used for synthesis of the pigment, and the calcination was conducted at 950° C. for 2 hr, thereby obtaining a black pigment.

Examples 3 to 5 and 9 to 14

The same procedure as defined in Example 1 was conducted except that the composition ratios of the raw materials and the calcination temperature were changed variously, thereby obtaining black pigments.

Example 6

The same procedure as defined in Example 1 was conducted to obtain a black pigment. Next, the thus obtained black pigment was wet-dispersed in water to obtain a slurry thereof. While dropping 0.5% by weight of a water glass to the slurry of the black pigment maintained at 70° C., the pH value of the slurry was adjusted to 7 by using hydrochloric acid or sodium hydroxide, and then the slurry was held under the same conditions for one hour. Thereafter, the resulting slurry was subjected to water-washing, dehydration, drying and pulverization treatments.

Examples 7 and 8

The same procedure as defined in Example 1 was conducted except that the calcination temperature and the conditions of the surface treatment were changed variously, thereby obtaining black pigments.

Example 15

An Mn—Fe composite oxide was produced in the same manner as defined in Example 1 except that Mn and Fe were used in amounts of 25 mol % and 75 mol %, respectively. One hundred parts by weight of the thus obtained Mn—Fe composite oxide were mixed with 100 parts by weight of magnesium hydroxide using a vibration mill.

Examples 16 to 18

The same procedure was conducted except that the magnesium hydroxide was replaced with various compounds shown in Table 2 while varying mixing ratios thereof, thereby obtaining black pigments.

Example 19

An Mn—Fe composite oxide was produced in the same manner as defined in Example 1 except that Mn and Fe were used in amounts of 33 mol % and 67 mol %, respectively. One hundred parts by weight of the thus obtained Mn—Fe composite oxide were mixed with 100 parts by weight of aluminum hydroxide using a vibration mill.

Examples 20 to 22

The same procedure was conducted except that the aluminum hydroxide was replaced with various compounds shown in Table 2 while varying mixing ratios thereof, thereby obtaining black pigments.

Comparative Examples 1 to 6

The same procedure as defined in Example 1 was conducted except that the composition ratios of the raw materials and the calcination temperature were changed variously, thereby obtaining black pigments. In Comparative Example 4, "MAT-305" produced by Toda Kogyo Corporation, was used as magnetite, whereas in Comparative Example 5, "BROWNOX" produced by Tosoh Corp., was used as magnetite.

The production conditions for producing the above infrared reflecting black pigments are shown in Tables 1 and 2; various properties of the resulting infrared reflecting black pigments are shown in Tables 3 and 4; and various properties of the resulting paints and coating films are shown in Table 5.

TABLE 1

Process for producing infrared reflecting black pigment

| | Raw materials (wt %) | | | | | | | Calcination temperature (° C.) | Surface treatment | |
|---|---|---|---|---|---|---|---|---|---|---|
| | $Mn_3O_4$ | $Fe_2O_3$ | $Fe_3O_4$ | $Mg(OH)_2$ | $Al(OH)_3$ | $CaCO_3$ | $SiO_2$ | | Kind | wt % |
| Example 1 | 5.0 | 15.6 | | 21.6 | 57.8 | | | 1000 | None | 0 |
| Example 2 | 5.9 | 18.5 | | 20.6 | 55.0 | | | 950 | None | 0 |
| Example 3 | 1.3 | 26.8 | | 20.5 | 51.5 | | | 1050 | None | 0 |
| Example 4 | 9.4 | 29.3 | | 16.7 | 44.6 | | | 850 | None | 0 |
| Example 5 | 12.0 | 37.6 | | 13.7 | 36.7 | | | 1000 | None | 0 |
| Example 6 | 14.4 | 45.2 | | 11.0 | 29.4 | | | 1050 | Si | 0.5 |
| Example 7 | 15.5 | 48.8 | | 9.7 | 26.0 | | | 1100 | Al | 0.5 |
| Example 8 | 16.6 | 52.2 | | 8.5 | 22.7 | | | 900 | Zr | 0.5 |
| Example 9 | 17.1 | 68.4 | | 3.9 | 10.6 | | | 1050 | None | 0 |
| Example 10 | 10.3 | 32.3 | | 57.4 | | | | 900 | None | 0 |
| Example 11 | 20.1 | 21.1 | | | | 58.8 | | 950 | None | 0 |
| Example 12 | 19.6 | 41.1 | | | | 39.2 | | 950 | None | 0 |
| Example 13 | 9.7 | 30.6 | | | 59.7 | | | 1050 | None | 0 |
| Example 14 | 9.8 | 30.6 | | | | | 59.6 | 1100 | None | 0 |
| Comp. Example 1 | | 100 | | | | | | 900 | None | 0 |
| Comp. Example 2 | 24.2 | 75.8 | | | | | | 1000 | None | 0 |
| Comp. Example 3 | 19.3 | 80.7 | | | | | | 1050 | None | 0 |
| Comp. Example 4 | 14.4 | 85.6 | | | | | | 1050 | None | 0 |
| Comp. Example 5 | 100 | | | | | | | 850 | None | 0 |
| Comp. Example 6 | | 73.3 | 26.7 | | | | | 1100 | None | 0 |

TABLE 2

Process for producing infrared reflecting black pigment

| | Mixing (part(s) by weight) | | | | | | |
|---|---|---|---|---|---|---|---|
| | MnFe composite oxide | $Mg(OH)_2$ | $Al(OH)_3$ | $CaCO_3$ | $SiO_2$ | $Al_2Si_2O_5(OH)_4$ |
| Example 15 | 100 | 100 | | | | |
| Example 16 | 100 | | | | 100 | |
| Example 17 | 100 | | | 100 | | |
| Example 18 | 100 | | 100 | | | |
| Example 19 | 100 | | 50 | | | |
| Example 20 | 100 | | | | | 100 |
| Example 21 | 100 | | | 150 | | |
| Example 22 | 100 | | 200 | | | |

TABLE 3

Properties of infrared reflecting black pigment

| | Composition (mol % of metal elements) | | | | | | (Mg + Al + Ca + Si)/(Mn + Fe) |
|---|---|---|---|---|---|---|---|
| | Mn | Fe | Mg | Al | Ca | Si | |
| Example 1 | 4.8 | 14.3 | 27.0 | 54.0 | | | 4.24 |
| Example 2 | 5.7 | 17.0 | 25.8 | 51.6 | | | 3.41 |
| Example 3 | 1.2 | 24.6 | 25.8 | 48.4 | | | 2.88 |
| Example 4 | 9.1 | 27.3 | 21.2 | 42.4 | | | 1.75 |
| Example 5 | 11.8 | 35.3 | 17.6 | 35.3 | | | 1.12 |
| Example 6 | 14.3 | 42.9 | 14.3 | 28.6 | | | 0.75 |
| Example 7 | 15.5 | 46.5 | 12.7 | 25.4 | | | 0.61 |
| Example 8 | 16.7 | 50.0 | 11.1 | 22.2 | | | 0.50 |
| Example 9 | 16.8 | 67.4 | 5.3 | 10.5 | | | 0.19 |
| Example 10 | 8.9 | 26.6 | 64.5 | | | | 1.82 |
| Example 11 | 23.4 | 23.5 | | | 53.1 | | 1.13 |
| Example 12 | 22.1 | 44.2 | | | 33.7 | | 0.51 |
| Example 13 | 10.0 | 30.0 | | 60.0 | | | 1.50 |

TABLE 3-continued

| | | Properties of infrared reflecting black pigment | | | |
|---|---|---|---|---|---|
| Example 14 | 8.5 | 25.5 | | 66.0 | 1.94 |
| Comp. Example 1 | | 100 | | | |
| Comp. Example 2 | 25 | 75 | | | |
| Comp. Example 3 | 20 | 80 | | | |
| Comp. Example 4 | 15 | 85 | | | |
| Comp. Example 5 | 100 | | | | |
| Comp. Example 6 | | 66.7 | 33.3 | | |

| | Constitutional elements, etc. | Properties of particles | |
|---|---|---|---|
| | | BET specific surface area ($m^2/g$) | Average particle diameter (μm) |
| Example 1 | Mn, Fe, Mg, Al, O | 11.3 | 0.5 |
| Example 2 | Mn, Fe, Mg, Al, O | 8.3 | 0.6 |
| Example 3 | Mn, Fe, Mg, Al, O | 3.5 | 0.7 |
| Example 4 | Mn, Fe, Mg, Al, O | 6.1 | 0.6 |
| Example 5 | Mn, Fe, Mg, Al, O | 4.6 | 0.7 |
| Example 6 | Mn, Fe, Mg, Al, Si, O | 3.1 | 0.8 |
| Example 7 | Mn, Fe, Mg, Al, O | 2.3 | 1.1 |
| Example 8 | Mn, Fe, Mg, Al, Ca, O | 3.0 | 0.8 |
| Example 9 | Mn, Fe, Mg, Al, O | 2.9 | 0.8 |
| Example 10 | Mn, Fe, Mg, O | 7.0 | 0.6 |
| Example 11 | Mn, Fe, Ca, O | 4.6 | 0.8 |
| Example 12 | Mn, Fe, Ca, O | 5.1 | 0.7 |
| Example 13 | Mn, Fe, Al, O | 6.5 | 0.7 |
| Example 14 | Mn, Fe, Si, O | 7.2 | 0.6 |
| Comp. Example 1 | Fe, O | 7.3 | 0.6 |
| Comp. Example 2 | Mn, Fe, O | 2.9 | 0.9 |
| Comp. Example 3 | Mn, Fe, O | 2.2 | 1.1 |
| Comp. Example 4 | Mn, Fe, O | 2.0 | 1.3 |
| Comp. Example 5 | Mn, O | 20.6 | 0.4 |
| Comp. Example 6 | Fe, Mg, O | 3.6 | 0.7 |

TABLE 4

| | Properties of infrared reflecting black pigment | | | | | | |
|---|---|---|---|---|---|---|---|
| | Composition (mol % of metal elements) | | | | | | |
| | Mn | Fe | Mg | Al | Ca | Si | (Mg + Al + Ca + Si)/(Mn + Fe) |
| Example 15 | 10.7 | 32.2 | 57.1 | | | | 1.33 |
| Example 16 | 10.9 | 32.8 | | | | 56.4 | 1.29 |
| Example 17 | 14.1 | 42.3 | | | 43.6 | | 0.77 |
| Example 18 | 12.5 | 37.6 | | 49.8 | | | 0.99 |
| Example 19 | 22.3 | 44.5 | 33.3 | | | | 0.50 |
| Example 20 | 15.1 | 30.1 | | 27.4 | | 27.4 | 1.21 |
| Example 21 | 15.4 | 30.8 | | | 53.8 | | 1.16 |
| Example 22 | 11.2 | 22.3 | | 66.5 | | | 1.98 |

| | Constitutional elements, etc. | Properties of particles | |
|---|---|---|---|
| | | BET specific surface area ($m^2/g$) | Average particle diameter (μm) |
| Example 15 | Mn, Fe, Mg, O | 13.8 | 0.4 |
| Example 16 | Mn, Fe, Si, O | 17.2 | 0.4 |
| Example 17 | Mn, Fe, Ca, O | 4.3 | 0.5 |

TABLE 4-continued

Properties of infrared reflecting black pigment

|  |  |  |  |
|---|---|---|---|
| Example 18 | Mn, Fe, Al, O | 14.3 | 0.4 |
| Example 19 | Mn, Fe, Al, O | 8.9 | 0.6 |
| Example 20 | Mn, Fe, Al, Si, O | 5.5 | 0.7 |
| Example 21 | Mn, Fe, Ca, O | 5.2 | 0.7 |
| Example 22 | Mn, Fe, Al, O | 18.8 | 0.3 |

TABLE 5

Properties of coating film

| | Hue | | | Solar radiation reflectance (%) | Lamp irradiation | |
|---|---|---|---|---|---|---|
| | Lightness L* | a* | b* | | Temperature after 10 min (° C.) | Temperature difference from Comp. Example 1 (° C.) |
| Example 1 | 25.51 | 1.50 | 0.29 | 20.9 | 47.3 | 6.4 |
| Example 2 | 25.9 | 1.44 | 0.29 | 19.0 | | |
| Example 3 | 27.1 | 1.71 | 0.52 | 18.7 | | |
| Example 4 | 25.99 | 1.75 | 0.53 | 18.6 | 48.3 | 5.4 |
| Example 5 | 25.3 | 1.57 | 0.44 | 17.0 | | |
| Example 6 | 24.5 | 1.57 | 0.56 | 17.1 | | |
| Example 7 | 24.9 | 1.60 | 0.46 | 17.2 | 48.6 | 5.1 |
| Example 8 | 23.9 | 1.62 | 0.56 | 15.8 | | |
| Example 9 | 23.7 | 1.54 | 0.6 | 15.5 | | |
| Example 10 | 29.0 | 1.98 | 0.84 | 20.4 | 47.5 | 6.2 |
| Example 11 | 26.34 | 1.65 | 0.8 | 16.7 | | |
| Example 12 | 26.2 | 1 | 0.1 | 15.8 | | |
| Example 13 | 28.4 | 1.97 | 0.72 | 20.6 | 47.4 | 6.3 |
| Example 14 | 26.8 | 1.98 | 0.6 | 20.4 | | |
| Example 15 | 26 | 1.57 | 0.56 | 17.2 | 48.6 | 5.1 |
| Example 16 | 24.9 | 1.73 | 0.36 | 17.5 | 48.5 | 5.2 |
| Example 17 | 25.4 | 1.87 | 0.77 | 18.0 | 48.3 | 5.4 |
| Example 18 | 25.4 | 1.78 | 0.7 | 18.2 | | |
| Example 19 | 24.3 | 1.61 | 0.65 | 16.9 | | |
| Example 20 | 25.3 | 1.76 | 0.69 | 17.7 | | |
| Example 21 | 27.9 | 2.1 | 0.99 | 20.8 | 47.2 | 6.5 |
| Example 22 | 29.18 | 2.1 | 0.77 | 20.5 | | |
| Comp. Example 1 | 21.6 | 0.6 | 0.3 | 4.8 | 53.7 | |
| Comp. Example 2 | 23.8 | 1.2 | 0.2 | 14.8 | 50.9 | 2.8 |
| Comp. Example 3 | 23.9 | 0.9 | −0.1 | 14.7 | | |
| Comp. Example 4 | 24.3 | 0.8 | −0.3 | 14.2 | | |
| Comp. Example 5 | 36.2 | 5.17 | 15.26 | 28.4 | | |
| Comp. Example 6 | 39.88 | 24.86 | 27.67 | 32 | | |

As shown in Table 5, it was confirmed that the infrared reflecting black pigments obtained according to the present invention (Examples) all exhibited a lightness (L*) of a coating film of not more than 30 and therefore an excellent blackness, and had a temperature difference upon lamp irradiation of not less than 3° C. and therefore an excellent infrared reflecting property.

INDUSTRIAL APPLICABILITY

The infrared reflecting black pigment according to the present invention is excellent in infrared reflecting property and comprises no expensive elements such as Co, and therefore is suitable as an inexpensive infrared reflecting black pigment. Also, the resin composition comprising the infrared reflecting black pigment according to the present invention is excellent in infrared reflecting property and therefore can be used in the following applications when forming the resin composition into sheets or films by known methods.

The sheet obtained from the resin composition comprising the infrared reflecting black pigment according to the present invention has a black color. Therefore, when the sheet is applied to agricultural multi-sheets, it is possible to prevent emergence and development of weeds and further suppress increase in temperature of a ground surface owing to its excellent infrared reflecting property. Thus, the sheet can be suitably used as a black agricultural multi-sheet.

Similarly, the sheet can be used as a back sheet for solar batteries. The solar battery module includes a plurality of solar cell elements whose front and rear surfaces are protected with a covering material. The back sheet for protecting a rear surface of the respective solar cell elements preferably has a high reflectance in view of a high power conversion efficiency, and is preferably in the form of a black-colored back sheet in view of a good design. In addition, the solar cell elements tends to be deteriorated in power generation efficiency as the temperature is raised. The sheet obtained from the resin composition comprising the infrared reflecting black pigment according to the present invention is fully provided with properties required as the back sheet for solar batteries and therefore can be preferably used as a back sheet for solar batteries.

Also, in order to hardly see an inside of vehicles from outside, a tinted film have been frequently attached onto a surface of a windshield glass thereof. The film is also required to have a property of suppressing increase in temperature within a compartment of vehicles. The film obtained from the resin composition comprising the infrared reflecting black pigment according to the present invention exhibits an excellent blackness and an excellent infrared reflecting property, and therefore can be suitably used as a tinted film to be attached onto a window glass of vehicles and buildings.

The invention claimed is:

1. An infrared reflecting black pigment comprising a compound comprising, in mol %, based on all of the metal elements in the black pigment
   15 to 90% Fe
   5 to 45% Mn
   and at least one element selected from the group consisting of Mg, Al, Ca, Si, Sr and Ba, each, when present, in an amount of 5 to 65% and provided that the compound is devoid of Cr and Co, which infrared reflecting black pigment has a blackness ($L^*$ value) of not more than 30 and a solar radiation reflectance of not less than 15%.

2. An infrared reflecting black pigment according to claim 1, wherein the compound comprising Fe, Mn and at least one element selected from the group consisting of Mg, Al, Ca, Si, Sr and Ba is in the form of a composite oxide.

3. An infrared reflecting black pigment according to claim 1, wherein the black pigment comprises a mixture of an Mn—Fe composite oxide and a compound comprising at least one element selected from the group consisting of Mg, Al, Ca, Si, Sr and Ba.

4. An infrared reflecting black pigment according to claim 3, wherein the compound comprising at least one element selected from the group consisting of Mg, Al, Ca, Si, Sr and Ba is mixed in an amount of 20 to 300 parts by weight based on 100 parts by weight of the Mn—Fe composite oxide.

5. A paint comprising a paint base material comprising the infrared reflecting black pigment as defined in claim 1.

6. A colored resin composition comprising the infrared reflecting black pigment as defined in claim 1, and a resin.

* * * * *